United States Patent
Laurence et al.

(10) Patent No.: US 11,795,083 B1
(45) Date of Patent: Oct. 24, 2023

(54) QUANTUM ENERGIZED WATER THROUGH THE SELECTIVE TREATMENT AND CONDITIONING OF A BASE AQUEOUS SOLUTION

(71) Applicant: Vita Technologies, Inc., Mountlake Terrace, CA (US)

(72) Inventors: Oliver S. Laurence, Seattle, WA (US); Frederick M. Graham, Jr., Mountlake Terrace, WA (US); Lee H. Lorenzen, Trubuco Canyon, CA (US)

(73) Assignee: Vita Technologies, Inc., Terrace, WA (US)

(*) Notice: Subject to any disclaimer, the term of this patent is extended or adjusted under 35 U.S.C. 154(b) by 0 days.

(21) Appl. No.: 17/213,160

(22) Filed: Mar. 25, 2021

Related U.S. Application Data

(60) Provisional application No. 62/994,566, filed on Mar. 25, 2020.

(51) Int. Cl.
| | |
|---|---|
| C02F 9/00 | (2023.01) |
| C02F 1/68 | (2023.01) |
| C02F 1/48 | (2023.01) |
| C02F 1/04 | (2023.01) |
| C02F 103/04 | (2006.01) |
| C02F 1/44 | (2023.01) |
| C02F 1/32 | (2023.01) |

(52) U.S. Cl.
CPC ............... *C02F 9/00* (2013.01); *C02F 1/04* (2013.01); *C02F 1/32* (2013.01); *C02F 1/441* (2013.01); *C02F 1/481* (2013.01); *C02F 1/484* (2013.01); *C02F 1/68* (2013.01); *C02F 2103/04* (2013.01)

(58) Field of Classification Search
CPC ...... C02F 9/00; C02F 1/04; C02F 1/32; C02F 1/441; C02F 1/481; C02F 1/484; C02F 1/68; C02F 2103/04; B01D 17/06; B01D 35/06; B03C 1/00; A61L 21/00
USPC ................................................... 210/652
See application file for complete search history.

(56) References Cited

U.S. PATENT DOCUMENTS

| | | | |
|---|---|---|---|
| 5,711,950 A | | 1/1998 | Lorenzen |
| 6,096,219 A | * | 8/2000 | Green ........... C02F 1/325 |
| | | | 422/186.01 |
| 8,252,171 B2 | * | 8/2012 | Doran ........... C02F 9/005 |
| | | | 210/243 |

FOREIGN PATENT DOCUMENTS

| | | | | |
|---|---|---|---|---|
| CN | 107651782 A | * | 2/2018 | ........... C02F 1/4693 |
| WO | WO-2019088912 A1 | * | 5/2019 | ........... C02F 1/68 |

* cited by examiner

*Primary Examiner* — Ekandra S. Miller-Cruz
(74) *Attorney, Agent, or Firm* — Fenwick & West, LLP

(57) ABSTRACT

A method for the creation of structured water in a laboratory or commercial setting may be bottled and distributed for human consumption. The method creates structured water that maintains its specific matrix structure for longer than structured water that is formed naturally (signal-locked water). The method creates signal-locked water by rendering the water prepared with a magnetic field, adding additives, exposing it to electromagnetic radiation, and adding a concentrate. The signal-locked water may be bottled and distributed for purchase and consumption.

18 Claims, 2 Drawing Sheets

QUANTUM ENERGIZED WATER THROUGH THE SELECTIVE TREATMENT AND CONDITIONING OF A BASE AQUEOUS SOLUTION

CROSS-REFERENCE TO RELATED APPLICATIONS

This application claims the benefit of U.S. Provisional application No. 62/994,566 filed on Mar. 25, 2020, which is incorporated in its entirety by this reference.

FIELD OF ART

The present disclosure generally relates to water processing, and, more particularly, to imparting energy during water processing.

BACKGROUND

Structured water has its molecules altered to a specific matrix. The surviving structure is thought to yield beneficial properties that make structured water desirable by optimizing cellular metabolism in humans, animals and plants. Natural processes such as the evaporation and condensation of water commonly create structured water. However, when natural physical processes create structured water, the imparted structure of the water molecules in their matrix dissipates quickly due to charge imbalances present within the structure. To be commercially viable and beneficially used by humans, structured water needs to remain stable for long enough to be packaged, reach the consumer and ingested. Accordingly, a process to create structured water that maintains its specific matrix for longer time periods than when extracted from a natural setting (e.g., deep water aquifers, glaciers, unheated living fruits, vegetables, nuts, seeds) would be beneficial to improving good health.

SUMMARY

The above and other problems may be addressed by a process creating structured water that maintains its structure for longer periods than naturally occurring structured water. To create the aforementioned structured water, the system obtains (or generates) a first volume of high-purity water and an additive system introduces one or more additives to the high-purity water to create the solution. Adding additives to the water increases its volume from a first volume to a second volume.

The system applies a magnetic field to the solution for a first period of time while the solution is circulating. Circulation can be pumping through pipes, a mixer in a beaker, or some other method of circulating water within the system. Application of the magnetic field terminates after the period of time, and the system applies electromagnetic radiation to the circulating water for a second period of time. The electromagnetic radiation can be electrical signals, various light frequencies, etc. Application of the electromagnetic radiation often terminates after the second period of time, and a concentrate is added to the circulating water. Adding the concentrate to the water increases its volume from the second volume to a third volume. Moreover, adding the concentrate to the water imparts structural characteristics of the concentrate to the circulating water.

Aspects and advantages of embodiments of the invention will be set forth in part in the following description, or may be obvious from the description, or may be learned through practice of the embodiments.

Figure 1:
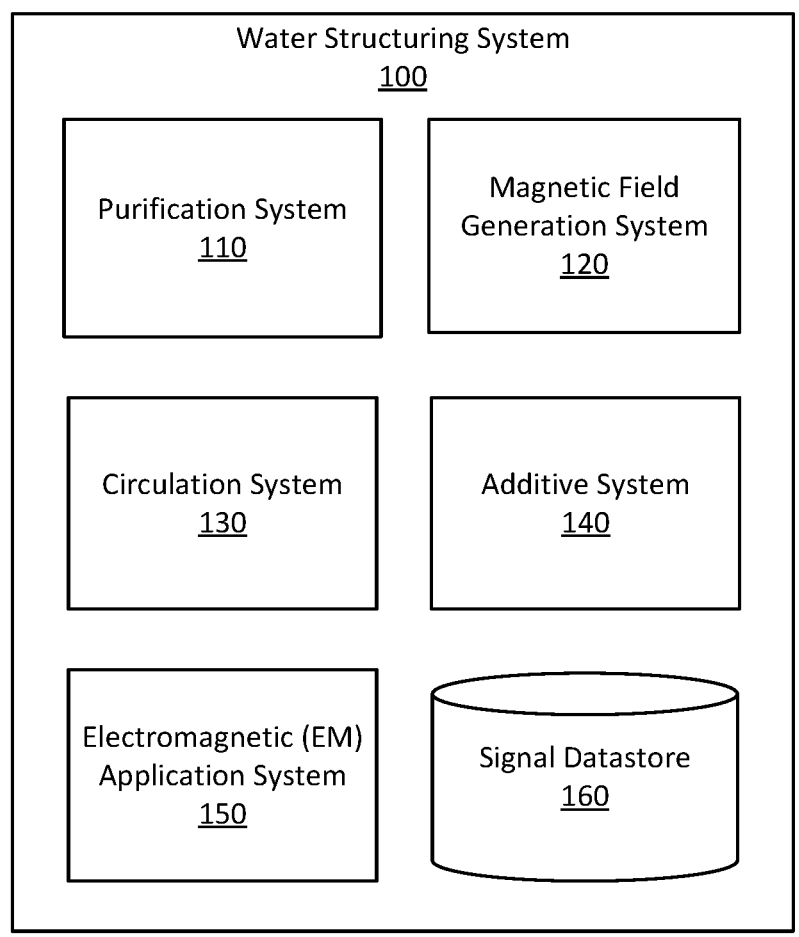
FIG. 1 is a system diagram showing the component systems of the water structuring system, according to one example embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

I. Introduction

Water forms naturally with its molecules arranged in a variety of matrix structures depending on the physical state of the water (i.e. solid, liquid or gas). Additionally, various configurations are present in the liquid state and are described as "structured water." Some illustrative examples of natural structured water most beneficial for optimizing cell health include water found in mountain springs, glacial melt, and also in living organisms. When freshly formed in these natural settings, water molecules energetically structured in this manner allow for several desirable properties. For example, structured water is beneficial for human health because it is more readily absorbed by human cells when consumed. However, structured water does not keep its structured matrix for long, thus, distributing naturally structured water for human consumption is difficult. A method for creating stable structured water to achieve the same properties as its naturally occurring structured water is much needed to encourage healthy equilibrium throughout the planet.

Described herein is a system and method of creating structured water that maintains its energized structure for a long period of time ("coherence time"), much longer than coherence times that occur naturally. Because the fabricated structured water has longer coherence times, it is possible to distribute the structured water for human consumption.

The process to create structured water is described in more detail below in the sections titled "Water Structuring System," and "Example Water Structuring Process." To describe the process briefly, an additive system introduces an additive to high-purity water. A magnetic field generation system applies a magnetic field to the water to prepare the water for structuring. An electromagnetic (EM) radiation system applies EM radiation of a desired frequency to the water. Applying the EM radiation energizes the water and imparts structure to its molecules. The additive system introduces a concentrate to the water and the energized water adapts some of the structural characteristics of the concentrate. Other substances may be added to the water during the process to imbue it with additional properties. These substances may include mineral powders, herbal extracts, and others.

II. Properties of Water

To begin, a brief description of the inherent properties of water will be useful. Water has at least 79 anomalous (irregular) physical properties. The anomalous properties of water in its solid, liquid, and gaseous states are a function of how the separate molecules of water relate and interact with each other. In particular, the unique properties of water in its solid and liquid forms may be related to the cumulative weak bonds and interactions that hold the water structure together. Some examples of weak bonds may include hydrogen bonding, Van der Waals forces, and weak electrostatic interactions, whereas covalent bonds hold the two hydrogen and single oxygen atom together. These bonds, in total, hold an individual water molecule together.

The nature of the bonds holding water together creates a charge imbalance in the water molecule. That is, sub-atomic particle sharing between the hydrogen and oxygen atoms in a water molecule leads to charge differences across the plane of the molecule. In some instances, the charge differential creates a stable charge imbalance that can be used to generate a water matrix structure beneficial to improving cell health.

III. Structured Water

The process described herein creates a version of structured water herein called quantum energized water (i.e., signal-locked water). Structured water is water having a matrix structure induced by electromagnetic radiation creating a stable charge imbalance. Signal-locked water is structured water having a long coherence time and a water matrix whose characteristics are modified by imparted electromagnetic energy ("modified water matrix"). Some of the physical principals in creating signal-locked water are described in greater detail below, but additional physical principals may also be at play.

To continue, as described above, naturally occurring water has an energized water matrix with a short coherence time. A short coherence time may occur due to how the water is formed. To expand, generally, water molecules tend to pack together to form a water matrix in a manner that is dictated by the lowest available energy state available to the molecules. During natural formation, relatively little energy is available during the packing process and the corresponding energy state and stability (i.e., coherence time) of the water matrix is low. If more energy is available during formation (i.e., during the molecular packing process), a water matrix can absorb and retain the additional energy to increase its stability and coherence. Using a simplified example, water molecules in an energetic environment may store, or place, additionally available energy in higher electron spin orbitals available to individual water molecules within the matrix during formation.

How energy is stored within molecules in a water matrix has an impact on the magnitude and orientation of the charge imbalance across the individual molecule. The imbalance, then, has the effect of changing the packing structure of the molecules within the water matrix. This effect can be cumulative. That is, as more energy is added into the water, the degree of packing and structure to the matrix becomes more complex. Therefore, providing more energy to water molecules allows them to form structured water with matrices having longer coherence times. In some cases, this may be why structured water has different characteristics than less structured water. For example, structured water may have a different surface tension, a different $O^{17}$-NMR spectrum, a different absorption spectrum, etc. to other water.

In some instances, once energized, a water matrix can be imprinted using energy sources having different electromagnetic frequencies. That is, the structural characteristics of an energized water matrix can be modified to take on some of the characteristics of the imprinting electromagnetic energy. For example, applying an electromagnetic or vibrational signal at a specific frequency to an energized water matrix may cause characteristics of that signal to be "locked" into the energized water matrix as energy within its bonds. That is, applying a signal to an energized water matrix creates signal-locked water that has a modified water matrix having one or more characteristics imparted by the signal.

Different methods of generating a modified water matrix are possible, and transmission of the electromagnetic energy into an energized water matrix may be dependent on appropriate contact of the water with a conductive medium. In a first example, electromagnetic energy may be radiatively coupled to water molecules. To illustrate, an alternating current magnetic field with a specific frequency may be applied to an energized water matrix to create a modified water matrix. In a second example, electromagnetic energy may be directly coupled to water molecules. To illustrate, a signal generator emitting electromagnetic radiation at a specific frequency may be inserted into water with an energized water matrix to create a modified water matrix. In a third example, water having a modified energy matrix at a specific frequency may be inserted into water with an energized water matrix to create a modified water matrix. In this case, when inserted, structural characteristics of the modified water matrix are imparted to the energized water matrix thereby creating signal-locked water.

The frequencies imparted to signal-locked water may grant functionality and directed activity to the signal-locked water. That is, the frequencies in the modified water matrix may mirror the natural frequency of some other substance. Because of this mirroring, the signal-locked water may be imbued with some of the functionality associated with those frequencies. In other words, the structural characteristics of a modified water matrix may reflect structural characteristics of other substances such that they function similarly.

The system and method described herein provide an energetic environment configured to create signal-locked water from other water sources.

IV. Water Structuring System

FIG. 1 is a system diagram showing the component systems of a water structuring system, according to one example embodiment. The water structuring system 100 may consist of a purification system 110, additive system 140, circulation system 130, magnetic field generation system 120, electromagnetic application system 150, and signal datastore 160. The water structuring system 100 employs its constituent systems to create signal-locked water. Signal-locked water, as described above, is structured water having long coherence times and a modified matrix structure from the water that is initially supplied to the system. Briefly, to create signal-locked water the water structuring system 100 obtains a first volume of high-purity water, adds one or more additives, applies one or more sources of electromagnetic radiation (e.g., applies a magnetic field or a vibrational signal), adds a concentrate, and circulates the water throughout the steps. Circulating the water may expose it to the electromagnetic sources at various degrees and in different variations.

As described herein, systems may refer to hardware components, software components, and/or computational logic for providing functionality to a water structuring system 100. That is, a system can be implemented in hardware, mechanical elements, firmware, and/or software (e.g., a hardware server comprising computational logic). Additional embodiments can include additional systems, may distribute functionality between systems, may attribute functionality to more or fewer systems, may be implemented as a standalone system or as part of a network of systems, and may be loaded into memory executable by processors. For example, the water structuring system 100 may be a standalone system or may have systems that are accessible via a network connection (e.g., the signal datastore 160). Other examples are also possible.

The purification system 110 generates or obtains a first volume of high-purity water. High-purity water is water that has a purity above a threshold purity level. For example, high-purity water may be water with a resistivity of 10 Megaohms and/or a total dissolved solid concentration (TDS) less than 0.5 parts per million (ppm). Other purity metrics and thresholds for purity are also possible. In a configuration, the water structuring system 100 may employ the purification system 110 to treat non-high-purity water and condition it to high-purity water. For example, the purification system 110 can generate high-purity water by conditioning tap water. In another configuration, the purification system 110 may obtain high-purity water from an external source. An example of an external source may be high-purity water purchased from a third party and delivered to the purification system 110, but could also include other external sources. Additionally, the purification system 110 may further purify water that is obtained from an external source. Of course, there are many different purification processes that may be employed by the purification system 110. For example, the purification system 110 may purify water by reverse osmosis or distillation, or any other water purification methods.

The additive system 140 adds material to a first type of water to create second type of water. For example, the additive system 140 can add an additive to a first volume of high-purity water to create a second volume of solution. Solution is high-purity water that includes an additive thoroughly mixed in. The additive may be a mineral, such as a silicate, or some other additive substance. In some configurations, the amount of additive added to the first volume of high-purity water to create the second volume of solution is small relative to the volume of the high-purity water, but other ratios are possible. To illustrate, the additive system 140 adds less than ten grams of a powdered mineral to thousands of gallons of high-purity water. However, in other examples, the volumetric ratio of additive to water in a solution may be 1:10, 1:1,000, 1:1,000,000, etc. In a second example, described in greater detail below, the additive system 140 creates signal-locked water by adding a concentrate to energized water.

The magnetic field generation system ("MFGS") 120 generates and applies a magnetic field to a solution to create prepared water. Prepared water is solution that has had a magnetic field applied to it for an application time. That application time may range from a few minutes to tens of hours. Applying the magnetic field "cleans" the matrix structure by normalizing the energies within the molecular matrix and providing a uniform base from which directed energy can be introduced. The application time may be dependent on several characteristics such as volume or temperature of the solution. For example, at small batch volumes, the water structuring system 100 creates prepared water by applying a 5,000 Gauss magnetic field to 10 gallons of circulating solution for an application time (e.g., 1 hour). In another example, at larger batch volumes, the water structuring system 100 creates prepared water by applying an 18,000 Gauss electromagnet to 5,000 gallons of circulating solution for 8 hours to generate prepared water.

The MFGS 120 can employ a variety of magnets to generate and apply the magnetic field. The strength of these magnets may range from 100 Gauss to several tens of thousands Gauss. For example, types of magnets may range from permanent magnets small enough to be handheld, to large electromagnets weighing several hundred pounds. The type of magnet may be dependent on the volume of solution rendered to prepared water or the application time for exposing the solution to the magnetic field. To illustrate, in small batch embodiments, the MFGS 120 may be a small permanent magnet placed near the volume of solution for 4 hours, or a strong permanent magnet for 1 hour.

The electromagnetic (EM) application system 150 applies EM radiation to prepared water to create energized water. Energized water is prepared water that has had electromagnetic radiation applied for an application time at one or more application wavelengths. Applying the EM radiation creates an energetic environment that allows structured water with long coherence times to form. The application time may be determined as a factor of volume or other characteristics, and the application time may be the same or different to other application times within the water structuring system 100. The application time may range from a few minutes to tens of hours. The application wavelength may be chosen based on the desired properties of the energized water. The application wavelength may be ultraviolet wavelengths, visible wavelengths, infrared wavelengths, or some other wavelength. That is, the application wavelength may range from a few nanometers to several centimeters. The application wavelength may also be a combination of wavelengths (e.g., 253 nm and 523 nm). Moreover, temperature may affect the application time and/or the application wavelength the EM application system 150 applies to prepared water when creating energized water.

To illustrate, in a first example, the EM application system 150 applies ultraviolet ("UV") light from a UV lamp to 1 gallon of prepared water for eight hours to create energized water. In a second example, the EM application system 150 applies UV radiation from a dozen UV bulbs to 5,000 gallons of prepared water for 3 hours to create energized water. In either example, by exposing the prepared water to the application wavelength for the application time, the water structuring system 100 creates energized water. Finally, in a third example demonstrating temperature effects, the EM application system 150 may apply UV radiation for 3 hours if the prepared water is 60 F or may apply EM radiation for 2 hours if the prepared water is 70 F.

Additionally, the EM application system 150 can create signal-locked water from the energized water. Signal-locked water is structured water having similar structural characteristics to the imparted EM radiation. For example, the EM application system 150 may apply a vibrational energy to the energized water to create signal-locked water or may apply an alternating field to the energized water to create signal-locked water. In these instances, the energized water adopts some of the structural characteristics of the imparted EM radiation.

Returning now to the additive system 140, the additive system 140 creates signal-locked water by adding a concentrate to energized water. The concentrate is an amount of structured water that, when applied to energized water, imparts structural characteristics of the concentrate to the energized water. Thus, when the additive system 140 adds a first volume of concentrate to energized water to create a second volume of signal-locked water, the signal-locked water shares at least some structural characteristics with the concentrate. In some configurations, the additive system adds the concentrate to the energized water while the EM application system 150 applies EM radiation to prepared water. Within these examples, the additive system 140 may add the concentrate just before the EM radiation is applied, at any point during the application time of the EM radiation, or after EM radiation is applied.

The water structuring system 100 may generate the concentrate or obtain the concentrate from an external source. Creating the concentrate uses a process largely similar to the described method of creating signal-locked water. For example, the water structuring system 100 adds an additive to distilled (or high-purity) water, applies a magnetic field for an application time, and applies EM radiation at an application wavelength for an application time. However, in some configurations, creating the concentrate may differ from the water structuring process. In a first example, the water structuring system 100 may create the concentrate at a small scale, though it does not have to be. To illustrate, the concentrate may be 0.25 gallons, 1 gallon, 10 gallons, or other volumes of concentrate. In a second example, the water structuring system 100 may create the concentrate using higher grade systems and components (e.g., in a laboratory rather than an industrial processing facility). Finally, the water structuring system 100 may employ the EM application system 150 to apply EM radiation to the water at a second application wavelength for a second application time to create the concentrate. Applying the second application wavelength for a second application time may alter the structural characteristics of the concentrate based on the applied radiation.

The circulation system 130 circulates the water in one or more steps of the process creating signal-locked water. For example, the circulation system 130 circulates the high-purity water while the additive is added to make the solution. Circulation during this step may help distribute the additive throughout the solution. The circulation system 130 also circulates the solution while the magnetic field is applied to create prepared water. Circulation at this step may ensure that water structuring system 100 applies the magnetic field to the entire volume of water. In small laboratory batches, the circulation system 130 may be a 2-inch magnetic stirrer bar in a 1-liter beaker that spins at 90 rotations per minute to circulate the liquid. In large commercial batches, the circulation system 130 may exist as a pump or turbine that moves several thousand gallons of liquid throughout a vat or a series of pipes.

The signal datastore 160 stores data associated with the above systems to streamline the water structuring process. For example, the signal datastore 160 holds the duration of magnetic field application necessary to create coherence in a specific volume of water. In another example, the signal datastore stores ratios of volumes of additives to add to a volume of water being processed.

V. Example Water Structuring Process

Figure 2:
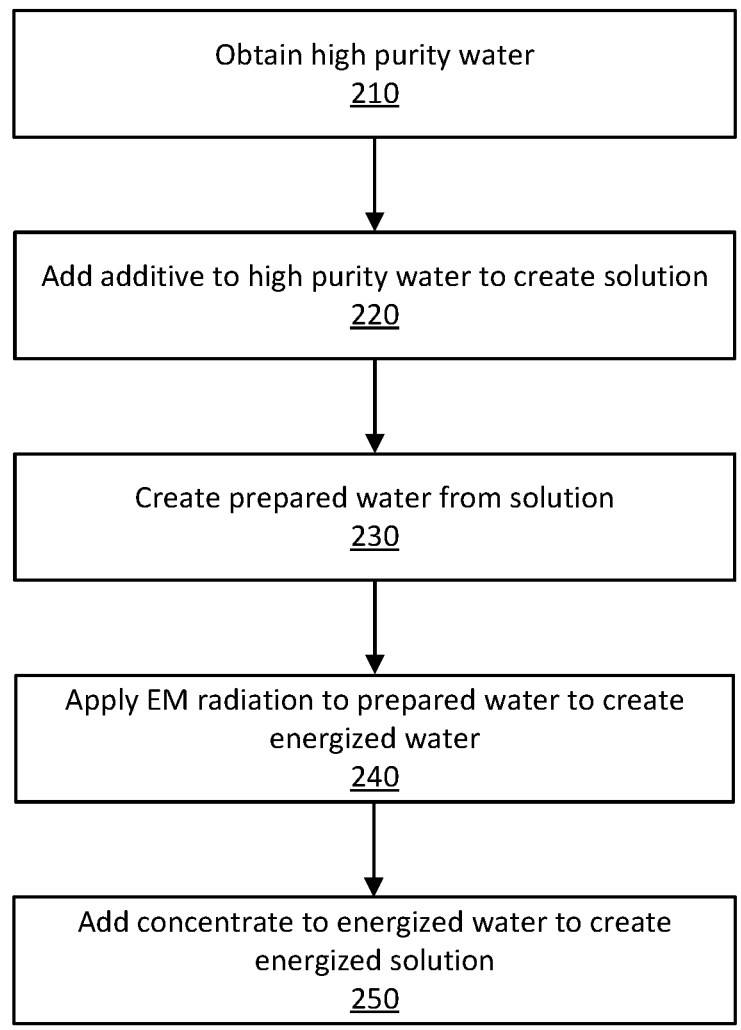
FIG. 2 is a flow chart illustrating a method of creating signal-locked water using a water structuring system, according to one example embodiment.

FIG. 2 is a flow chart illustrating a method of creating signal-locked water using a water structuring system, according to one example embodiment. The steps shown in FIG. 2 may be performed by the systems of the water structuring system 100 in FIG. 1 or may be performed by other systems. However, in other embodiments, some or all of the steps may be performed by other entities or systems. In addition, other embodiments may include different, additional, or fewer steps, and the steps may be performed in different orders.

To create signal-locked water, the water structuring system 100 obtains 210 a first volume of high-purity water from the purification system 110. For example, the purification system 110 may obtain a first volume of water that has a resistivity of 10 Megaohms and/or a TDS level below 0.5 ppm The water structuring system 100 may obtain the first volume of high-purity water from an external supplier or generate the high-purity water itself.

The water structuring system 100 employs the additive system 140 to create a solution from the high-purity water. To do so, the additive system 140 adds 220 an additive to the first volume of high-purity water to create a second volume of solution. For example, the additive system 140 adds 220 a silicate, mineral, or other substance to the high-purity water to create a second volume of solution. In this example, the additive system 140 may add ten or less grams of a mineral additive to 5000 gallons of high-purity water.

The water structuring system 100 engages the circulation system 130 to circulate the water. In various examples, the water structuring system 100 may add material (e.g., additives, concentrate, etc.) to the water (e.g., high-purity water, prepared water, etc.) while the water is circulating or may add the material and then begin circulating the water. Whatever the case, circulating the material and the water thoroughly mixes the material into the water.

The water structuring system 100 activates the MFGS 120 to apply a magnetic field to the circulating solution to create 230 prepared water. For example, the MFGS 120 powers an electromagnet which applies an 18,000 Gauss magnetic field to the solution for four hours as the solution circulates within the water structuring system 100. Applying the magnetic field to the solution for the first period of time renders the solution into prepared water. Generally, because no substance is added to the solution, the volume of prepared water is the same as the solution (i.e., the second volume). After the first period of time, the water structuring system 100 deactivates the MFGS 120 to terminate application of the magnetic field (e.g., turning off the electromagnet).

The water structuring system 100 activates the EM application system 150 to apply 240 EM radiation to the circulating prepared water for a second period of time to create energized water. For example, the EM application system 150 may apply 254 nm wavelength light to the prepared water for two hours as the water circulates within the water structuring system 100. Applying EM radiation to the circulating prepared water for the second period of time renders the prepared water into energized water. After the second period of time, the water structuring system 100 deactivates the EM application system to terminate application of the EM radiation (e.g., turning of UV lights).

The water structuring system 100 employs the additive system 140 to create signal-locked water from the energized water. To do so, the water structuring system 100 adds 250 a concentrate to the second volume of energized water to create a third volume of signal-locked water. As described above, the concentrate may be added to the energized water while it is circulating, or the energized water may be circulated after the concentrate is added to the energized water. Whatever the case, circulating the concentrate with the energized water mixes the two to create VSW signal-locked water.

In some embodiments water structuring system 100 may employ the additive system 140 to add additional substances to the signal locked water such as, but not limited to, herbal concentrates, core minerals, or alcohols to create a fourth volume of signal-locked solution. VSW signal-locked solution is signal-locked water with additional additives added. In some cases, the additional substances may assist in maintaining the structure of signal-locked water.

VI. Bottling and Distribution

The process explained above results in signal-locked water that keeps its structure significantly longer than naturally formed structured water. Naturally formed structured water may lose its beneficial matrix structure in a matter of minutes or hours while the signal-locked water resulting from this process may maintain the same structure for weeks, months or years. Because the signal-locked water from this process maintains its structure it is able to be distributed for human consumption.

Distribution of the signal-locked water consists of bottling and transportation of the bottled signal-locked water to appropriate markets. Signal-locked water may be bottled in a range of sizes including single-serving 8 oz bottles, 10-gallon jugs and larger. Bottles may be made of biodegradable BPA free and other minimized EA leaching chemicals that are clear or colored plastic, or glass. Once the signal-locked water is sealed into its appropriate container it is packaged and transported. Small bottles such as 8 to 16 oz bottles may be packaged together in packs of 6, 12, or 24 such that they can be transported easily and bought in multiples. The signal-locked water is then shipped via methods such as ground or air to markets including grocery stores and convenience stores where it is readily available for purchase by consumers.

VII. Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   generating or obtaining high-purity water;
   adding an additive to the high-purity water to create a solution;
   creating prepared water from the solution by:
      applying a magnetic field to the solution for a first period of time, and
      while the magnetic field is applied to the solution, circulating the solution with a circulation system;
   after the first period of time and while the circulation system circulates the prepared water, applying electromagnetic radiation to the prepared water for a second period of time to create energized water;
   after the second period of time and while the circulation system circulates the energized water, adding a concentrate of structured water to the energized water to create signal-locked water, wherein adding the concentrate of structured water to the energized water modifies a matrix structure of the energized water such that a matrix structure of the signal-locked water is different than the matrix structure of the energized water, and the matrix structure of any particular type of water comprises an arrangement of water molecules in that particular type of water.

2. The method of claim 1 wherein applying the magnetic field to the solution for the first period of time comprises:
   applying the magnetic field to the solution for between four hours and eight hours.

3. The method of claim 1 wherein applying the electromagnetic radiation to the prepared water for the second period of time comprises:
   applying the electromagnetic radiation to the prepared water for between six hours and ten hours.

4. The method of claim 1, further comprising: adding additional additives to the signal-locked water, wherein the additional additives comprise any of herbal extracts or alcohols.

5. The method of claim 1, wherein applying electromagnetic radiation to the prepared water to create energized water further comprises: modifying a matrix structure of the prepared water such that the matrix structure of the energized water is different than the matrix structure of the prepared water.

6. The method of claim 1 wherein the prepared water has a shorter coherence time than both the energized water and the signal-locked water.

7. The method of claim 1, wherein generating or obtaining the high-purity water further comprises:
   receiving non-high-purity water; and
   conditioning the non-high-purity water via purification methods comprising any of reverse osmosis or distillation to create the high-purity water.

8. The method of claim 1, further comprising packaging the signal-locked water into one or more containers.

9. The method of claim 8, further comprising distributing the one or more containers of the signal-locked water to retailers via ground, air, or water transportation.

10. A system comprising:
    a purification system that is configured to generate or obtain high-purity water;

an additive system that is configured to add an additive to the high-purity water to create a solution, a magnetic field generation system that is configured to apply a magnetic field to the solution for a first period of time to create prepared water;

an electromagnetic radiation system that is configured to apply electromagnetic radiation to the prepared water for a second period of time to create energized water;

wherein the additive system is further configured to add a concentrate of structured water to the energized water to create signal-locked water, wherein adding the concentrate of structured water to the energized water modifies a matrix structure of the energized water such that a matrix structure of the signal-locked water is different than the matrix structure of the energized water, and the matrix structure of any particular type of water comprises an arrangement of water molecules in that particular type of water; and a circulation system configured to:

circulate the solution for the first period of time while the magnetic field is applied to the solution;

circulate the prepared water for the second period of time while the electromagnetic radiation is applied to the prepared water;

circulate the energized water for a third period of time while the additive system adds the concentrate the energized water.

11. The system of claim 10, wherein the first period of time is between four hours and eight hours.

12. The system of claim 10, wherein the second period of time is between six hours and ten hours.

13. The system of claim 10, wherein the additive system is further configured to add additional additives comprising any of herbal extracts or alcohols to the signal-locked water.

14. The system of claim 10, wherein the electromagnetic radiation system is further configured to modify a matrix structure of the prepared water such that a matrix of the energized water is different than the matrix structure of the prepared water.

15. The system of claim 10 wherein the electromagnetic radiation system is further configured to create the energized water having a shorter coherence time than the signal-locked water.

16. The system of claim 10, wherein the purification system, when generating the high-purity water, is further configured to:

receive non-high-purity water; and condition the non-high-purity water via purification methods comprising any of reverse osmosis or distillation to create the high-purity water.

17. The system of claim 10, wherein the system is further configured to package the signal-locked water into one or more containers.

18. The system of claim 17, wherein the one or more containers of the signal-locked water distributable to retailers via ground, air, or water transportation.

* * * * *